United States Patent Office 3,520,958
Patented July 21, 1970

3,520,958
METHOD FOR PREPARING AN OXIDIC FISSILE MATERIAL CONTAINING A METAL BORIDE AS BURNABLE POISON
Geert Versteeg, Petten, Albertus J. G. Engel, Heiloo, and Fokko W. Hamburg, Petten, Netherlands, assignors to Reactor Centrum Nederland Development of Nuclear Science for Peaceful Purposes, The Hague, Netherlands, an Institut of the Netherlands
No Drawing. Filed Oct. 5, 1967, Ser. No. 673,023
Int. Cl. G21c 21/00
U.S. Cl. 264—.5
6 Claims

ABSTRACT OF THE DISCLOSURE

A method of preparing sintered uranium dioxide or plutonium dioxide in admixture with a metal boride as a burnable poison or resonance absorber. A mixture of the granular oxide and the granular metal boride is pressed and then reduced in an atmosphere containing CO to remove some of the excess oxygen which would attack the boride during the subsequent sintering step.

---

The invention relates to a method of preparing an oxidic fissile material containing a metal boride in admixture, the method comprising the steps of mixing granular metal boride with an oxide matrix based on fissile oxide, pressing the mixture and sintering it at a high temperature, these operations being performed in succession. The metal boride serves as a burnable poison or as resonance absorber. This latter may have a life which is just as long as that of the fissile material in which the resonance absorber is contained.

Resonance absorbers are employed as a safety device in some fast reactors. In the core of such a reactor, materials which act as a neutron moderator are not permitted in significant amounts at normal reactor conditions. In steam cooled reactors for instance, water might come inadvertently inside the reactor-core with the result that this would become over-critical, which is undesirable. Over-criticality can be avoided by introducing in the fissile material in the core particles of a material which has a high cross-section for epithermal and thermal neutrons and by their dimensions a very great self-shielding power. The neutrons which originate by fast fission reaction show a certain energy spectrum into which neutrons of low energy occur too. It is necessary that at normal reactor conditions not a too large amount of these low energetic neutrons is captured by the resonance absorber. A too great capture in the resonance absorber is anticipated by giving the individual absorber particles a relative great dimension.

In addition to serving as a burnable poison or a resonance absorber a metal boride of this kind may improve the thermal qualities of the fissile material. This is because the dioxides of uranium and plutonium possess a low thermal conductivity coefficient and a high dilation coefficient. In consequence of this, sintered pellets of the dioxides will be mostly broken into pieces after irradiation. As metal borides have a good thermal conductivity coefficient, the thermal qualities of the fissile material can be improved by mixing greater amounts of the metal boride with the fissile material. Especially contemplated here are fissile materials for fast reactors in which eventually an amount of the isotope $B^{10}$ is eliminated from the used boron by means of isotope separation.

By oxide matrix is meant here an oxide mixture composed entirely or partly of uranium dioxide and/or plutonium dioxide.

It has been found that some metal borides which may be used as burnable poison during the sintering process are attacked by oxygen which is present over the stoichiometric composition in the fissile oxide. This is the case, for instance, with $UB_4$.

Uranium dioxide and plutonium dioxide, especially powders which generally constitute the initial material for fissile elements, contain under atmospheric influence a larger amount of oxygen than would correspond to their stoichiometric compositions, unless special reducing agents are employed.

This high oxygen content gives rise to difficulties when one wishes to sinter the dioxide with an oxidizable metal boride.

It is a fact that some metal borides are easily attacked by this excess of oxygen. This excess of oxygen is dissolved in the normal cubic lattice and has at high temperature a relatively high oxygen tension. Metal borides are liable to be attacked by the free oxygen.

When the boride is thus attacked the boron from the boride spreads over the dioxide matrix, as a result of which the self-shielding effect of the discrete metal boride particles is lost. The loss of the self-shielding effect is highly detrimental to the serviceability of the burnable poison used.

Moreover, owing to this boron migration the boron may arrive at a position with a relatively high flux, as a result of which the poison burns away more quickly than was originally calculated.

Uncontrolled loss of self-shielding and uncontrolled migration to positions with a high flux may have the effect that a nuclear reactor rather abruptly ceases to be critical if insufficient over-reactivity has been introduced into the reactor core. The introduction of a comparatively high excess of over-reactivity is uneconomical. An obvious way of introducing a metal boride into the dioxide would be to reduce the dioxide beforehand into the stoichiometric composition. It has been found, however, that a stoichiometric dioxide is very difficult to sinter. For good sintering qualities a certain excess of oxygen in the dioxide is always necessary.

A common method of sintering uranium dioxide powder is to sinter a uranium dioxide having an oxygen-to-uranium atomic ratio between 2.07 and 2.19 in an atmosphere of nitrogen at a temperature of approximately 1300° C., followed by reduction with a mixture of $N_2$ and $H_2$ at the same temperature. With an oxygen-to-uranium ratio of about 2.04 a sintering temperature of about 1600° C. must be employed in order to obtain a high sintering density.

However, if this oxygen-to-uranium ratio and these temperatures were applied in practice for sintering uranium dioxide with an oxidizable metal boride contained in it, a serious oxidation of this metal boride would result.

The present invention aims at providing a method of solution for sintering oxidizable metal borides with an oxide matrix based on uranium dioxide without the boride becoming oxidized, while a good sintering density is nevertheless obtained.

According to the present invention the oxide matrix in admixture with the boride is reduced in pure CO or a mixture of CO and another gas until the uranium dioxide or plutonium dioxide in the oxide matrix has a very low oxygen-to-metal ratio ranging between 2.01 and 2.025, after which sintering is effected in an inert atmosphere. The numerical values 2.01 and 2.025 were determined in the course of reduction of a uranium oxide identical with the one which contained an oxidizable metal boride. In view of the difficulty in handling reduced and unsintered uranium dioxide, these values should be regarded as guiding figures.

The surprising discovery was made that uranium dioxide which has been reduced until it contains a very low excess of oxygen, can still be sintered to a high density.

If the mean oxygen content is reduced with CO to a value between 2.01 and 2.025, it is possible by employing an inert atmosphere at somewhat higher temperatures than normal to obtain a density of 10.40 g./cm.$^3$ or higher in the sintering stage following immediately upon reduction. By inert is meant an atmosphere which does not attack the metal boride. A good inert atmosphere is an atmosphere of a rare gas. The rare gases on the market which can be used for this purpose are helium and argon. Preference is given to argon.

The sintering of uranium dioxide in an atmosphere of CO only does not leave a sufficient excess of oxygen in the uranium dioxide to bring about sintering by increase of temperature. The result of this is that it is not possible to obtain a high density.

A reducing agent which has a somewhat lower reducing power is hydrogen. Hydrogen gas gives a good sintering density because all the oxygen does not vanish so quickly. Hydrogen, however, shows the drawback that it attacks borides. $UB_4$, for instance, is attacked by hydrogen.

Nitrogen cannot be used as an inert atmosphere either, because at a high temperature it gives rise to nitride formation in borides, this being the case with $UB_4$.

A favorable temperature for reduction with pure CO prior to sintering lies between 350° C. and 520° C. It has been found that there is a preferential region between 450° C. and 500° C.

The extension of this preferential region to lower temperatures depends upon:

(1) The nature of the oxide matrix (especially the O/U ratio of the fissile oxide is important in this connection);

(2) The way in which the oxide matrix is mixed with metal boride and pressed; and (3) The way in which the reduction temperature is reached.

During reduction two reactions may take place simultaneously in the mixture of uranium dioxide and metal boride, viz. reduction of the non-stoichiometric uranium dioxide crystals and oxidation of the metal boride by the existing excess of oxygen which has not been sufficiently removed by the reduction process. It has been found that at about 500° C. the oxygen is sufficiently removed without this resulting in oxidation of the metal boride. The small amount of oxygen which remains at this reduction temperature is still sufficient for obtaining a high sintering density in the course of sintering. The amount of oxygen required for sintering is low enough to prevent oxidation during the ultimate sintering process. During sintering in the inert atmosphere at 1500° C. or higher, practically all the excess of oxygen disappears.

Suitable burnable poisons for sintering with a uranium oxide matrix are $UB_4$, $ThB_4$ or a mixed tetraboride of uranium and thorium. These borides are extremely stable thermodynamically towards $UO_2$.

A uranium dioxide having originally an oxygen-to-uranium ratio of approximately 2.04 and a specific surface area of about 1 m.$^2$/g. is very suitable for sintering with a metal boride. A uranium dioxide of this kind can very easily be obtained by preparation according to the so-called wet process. By a $UO_2$ prepared according to the wet process is meant a substance which is formed by reduction and calcination from a precipitate of ammonium diuranate or uranium peroxide.

A method which has been found serviceable by experiment is that of first heating from 20° C. to about 500° C. in a CO atmosphere within a period of half an hour or less, reducing at this temperature for at least half an hour and afterwards heating in an inert atmosphere from 500° C. to about 1600° C. during a period of from two to three hours and maintaining this temperature for about one hour.

With a low oxygen-to-uranium ratio a uranium dioxide powder is definitely unsuitable for obtaining high densities of the $UO_2$ at temperatures lower than 1550° C.

For obtaining higher sintering densities the following method is applied.

A quantity of the burnable poison is first mixed with a small amount of an oxide matrix to which zinc stearate has been added as lubricant, after which larger amounts of the oxide matrix are gradually added to the mixture. After this a pill is shaped in a press, which pill is introduced into a furnace which is heated in a CO atmosphere to a temperature up to 500° C. within a period of half an hour or less. After reduction the CO atmosphere is replaced by an inert atmosphere, e.g. argon, and sintering continued up to an ultimate temperature of about 1600° C. During this continued sintering the furnace is heated up from 500° C. to 1600° C. within a period of from two to three hours. Practically all the zinc stearate disappears during the sintering process. A small amount of carbon remains behind as free carbon or as uranium carbide in the crystal lattice of the uranium dioxide. These small quantities of free or bound carbon do not impair the final product, as carbon is not a neutron-absorbing element. The uranium dioxide surrounding the burnable poison therefore remains pure from the nuclear point of view.

A description now follows of part of a series of tests as set forth in Table I, in which the invention is further elucidated.

Pills were obtained in the course of the tests by first mixing uranium dioxide with approximately 0.6 percent by weight of $UB_4$ globules, with the addition of about 0.2 percent by weight of zinc stearate, and afterwards pressing measured quantities of this mixture. These pills were subjected to the conditions stated in Table I.

The $UB_4$ globules were prepared by fusing $UB_4$ in a high-frequency plasm flame. The particles were of a size ranging between 85 and 125 microns.

The uranium dioxides used were obtained by calcining an ammonium diuranate precipitate and reducing it with a mixture of hydrogen and nitrogen at a temperature of

TABLE 1 [1]

| | 1 | 2 | 3 | 4 | 5 |
|---|---|---|---|---|---|
| Test | Reduction temp., ° C. | Reduction atmosphere | Original O/U ratio | Ultimate density | Stability towards $UO_2$ |
| 1 | 300 | CO | 2.038 | 94.3 | Slightly attacked. |
| 2 | 400 | CO | 2.038 | 94.3 | Do. |
| 3 | 400 | CO | 2.041 | 93.8 | Do. |
| 4 | 450 | CO | 2.038 | 94.1 | Very slightly attacked. |
| 5 | 500 | CO | 2.038 | 93.2 | Good. |
| 6 | 500 | CO | 2.038 | 93.6 | Do. |
| 7 | 550 | CO | 2.038 | 93.8 | Very slightly attacked. |
| 8 | 550 | CO | 2.038 | 92.5 | Space between $UB_4$ and matrix. |
| 9 | 400 | $H_2$ | 2.041 | 93.6 | Attacked. |
| 10 | 500 | $H_2$ | 2.041 | 93.6 | Do. |
| 11 | 600 | $H_2$ | 2.041 | ([2]) | Seriously attacked. |
| 12 | 600 | $H_2$ | 2.041 | 93.3 | Attacked. |

[1] Except in test 11, all the pills were sintered by raising the temperature in 2½ hours from about 500° C. to 1,550° C. in an argon atmosphere.
[2] Not sintered.

700° C. The uranium dioxides had a specific surface area which was smaller than approximately 1 m.²/gram.

For the preparation of $UO_2$ tablets containing burnable poison on a technical scale, in which the pressed "green tablets" as well as the initial powder were exposed to the air for a long period, reduction with CO is indispensable to practical working.

It was ascertained by means of experiments that powders even with very low specific surface areas absorb oxygen from the air. Reduction with CO makes the $O/U$ ratio again low and homogeneous.

Columns 1–5 in Table I represent the following:

Column 1—Reduction temperature; this is the temperature at which treatment is carried out for a period of half an hour or longer.

Column 2—Reduction atmosphere; for tests 1–10 and test 12 this is the atmosphere in which reduction was effected.

Column 3—Original oxygen-to-uranium ratio; this is the $O/U$ ratio which was taken as basis. The ultimate $O/U$ ratio approximates very closely to a value of 2.

Column 4—Ultimate density; this is the percentage of the theoretical density. The theoretical density of $UO_2$ is 10.96 g./cm.³.

Column 5—Stability towards $UO_2$. This has already been discussed in the foregoing.

From determinations of the $O/U$ ratios in non-stoichiometric $UO_2$ pills reduced with CO at 500° C., an $O/U$ ratio between 2.01 and 2.025 may be taken for pills containing $UB_4$.

From tests 1–8 it follows that the most favourable temperature for reduction with CO lies between 450° C. and 500° C.

Reduction with hydrogen at a low temperature has, according to these experiments, not led to good results.

It appeared experimentally that better sinter results could be obtained by sintering of a metal boride that contains no foreign admixtures.

The invention may be further elucidated by the following exemplary methods:

METHOD I

A suitable method for the preparation of a boride consisting exclusively of metal and boron is fusing of a metal oxide with boron in an electron beam melting furnace.

An electron beam melting furnace may consist of an evacuable space into which one finds a cathode and a hollow anode. After evacuation of the evacuable space a potential difference of 10 kv. is established between anode and cathode. From the cathode now a beam of electrons comes free, which is directed to the anode. As the anode is hollow most of the electrons fly through the anode and hit the contents of a crucible which is placed after the anode. The crucible after the anode is made from copper and contains for example pressed pellets of a mixture of $UO_2$ and B.

For directing the electron beam across the whole contents of the crucible focussing electrodes are placed between anode and cathode.

The copper crucible is cooled with water to prevent melting.

To prevent a too large negative potential of the crucible this is grounded.

METHOD II

Another method for the preparation of a boride comprises fusing of an intimate mixture of $UO_2$ and B in a flame arc. Under reduced pressure a continuous current flame arc is drawn between the mixture in a crucible and an electrode under a protecting atmosphere as for example argon.

The aforementioned in an electron beam melting furnace fused pellets of uranium borides are broken from the copper crucible after disconnecting the current and breaking of the vacuum.

After the pellets are broken into pieces, the pieces are ground to a powder. Next the obtained uranium boride powder is spheroidized in a HF argon plasma.

After sintering of the obtained uranium boride spheres with uranium dioxide according to the aforementioned methods, the results will be better than with uranium boride prepared at 2000° C. in graphite crucibles.

It appeared that the uranium boride spheres, of which the uranium boride was prepared in an electron beam melting furnace, were clean connected with the uranium dioxide matrix without a transition layer.

With spheres of uranium boride that contained about 10 weight percent carbon however, it appeared that there existed after sintering a very thin transition layer between the boride and the uranium dioxide. This transition layer can possibly cause boron migration during irradiation of the nuclear fuel.

The said boride was prepared by first heating uranium dioxide and boron under an inert atmosphere to about 2000° C. or higher in graphite crucibles.

Next the boride was densified by pressing in a hydraulic press at about 2000° C. under a pressure of about 0.5–1 tons/cm.² in graphite dies with graphite pistons.

By HF-heating the uranium boride was held at the required high temperature.

METHOD III

Hereunder follows a description of the preparation of a uranium dioxide that gives excellent results when sintered with uranium boride spheroids.

The said uranium dioxide is prepared by consecutively drying, calcining in an inert gas atmosphere and reducing an ammonium diuranate precipitate. The uranium diuranate precipitate was obtained by addition of ammonia to a stirred solution of a uranyl salt as uranyl nitrate in water until the pH was about 8 at a temperature of 60±10° C.

The concentration of the uranyl salt solution is very important in view of good sinter results, for this reason the uranium concentration has to be between 125 and 200 g. U/l.

It is known that at a low uranium concentration (lower than 50 g./l.) by addition of ammonia an ammonium diuranate precipitate originates of which the particles are more like platelets. This precipitate sinters more readily and at lower temperatures than a precipitate that from higher concentrated solutions is precipitated. For this reason the possibility exists that one has to deal with a partly sintered uranium dioxide, this has as result that cracks originate in the sintered uranium dioxide pellets.

The further data of the uranium dioxide preparation are drying temperature about 130° C., calcining and reducing temperature between 375 and 800° C.

The reducing and calcining is preferably performed near the upper temperature limit of 800° C.

While preferred embodiments of the present invention have been described the details thereof are intended to be exemplary and not limiting except as they appear in the appended claims.

What is claimed is:

1. A method of preparing an oxidic fissile material containing in admixture a metal boride, whereby reactions with the oxide material at the grain surface of the metal boride admixture are avoided, said method comprising: forming a mixture of an oxide selected from the group consisting of uranium dioxide, plutonium dioxide and oxide mixtures containing at least one of these oxides and a metal boride selected from the group consisting of uranium boride, thorium boride and a mixed tetra boride of uranium and thorium; pressing the mixture and reducing the excess of oxygen present in the dioxide until the oxygen-to-metal ratio in the dioxide is between 2.01 and 2.025 by heating the mixture in a carbon-dioxide-free atmosphere containing CO at a temperature between 350 and 520° C.; and then sintering at temperatures higher than 1500° C. in an atmosphere of an inert gas.

2. A method according to claim 1, wherein said reducing step is effected in pure CO at a temperature between 450° C. and 500° C. and wherein the fissile oxide consists of uranium dioxide.

3. A method according to claim 1 wherein the reducing step is effected for a period of at least one half hour at a temperature between 450 and 500° C. and wherein the sintering step is effected in an inert gas atmosphere at a temperature of about 1600° C. for a period of 2 to 3 hours.

4. A method according to claim 1 wherein the amount of $B^{10}$ in the borides is reduced.

5. A method according to claim 1 wherein the metal boride is free from foreign admixtures.

6. A method according to claim 1 wherein said inert gas atmosphere is an atmosphere of a rare gas selected from the group consisting of helium and argon.

References Cited
UNITED STATES PATENTS

| | | | |
|---|---|---|---|
| 3,263,004 | 7/1966 | Bean | 264—.5 |
| 3,320,176 | 5/1967 | Davis | 252—301.1 |
| 3,349,152 | 10/1967 | Watanabe et al. | 264—.5 |
| 3,361,857 | 1/1968 | Rose | 264—.5 |
| 3,372,213 | 3/1968 | Nishiyama et al. | 264—.5 |
| 3,375,306 | 3/1968 | Russell et al. | 264—.5 |

FOREIGN PATENTS

| | | |
|---|---|---|
| 1,159,334 | 12/1963 | Germany. |
| 953,977 | 4/1964 | Great Britain. |

CARL D. QUARFORTH, Primary Examiner

M. J. SCOLNICK, Assistant Examiner

U.S. Cl. X.R.

75—224; 176—89, 93; 252—301.1